(12) United States Patent
Hsieh

(10) Patent No.: US 6,324,086 B1
(45) Date of Patent: Nov. 27, 2001

(54) POWER SOURCE SUPPLIER USABLE IN AN AUTOMOBILE

(76) Inventor: Simon Hsieh, 20635 E. Valley Blvd., #E, Walnut, CA (US) 91789

( * ) Notice: Subject to any disclaimer, the term of this patent is extended or adjusted under 35 U.S.C. 154(b) by 0 days.

(21) Appl. No.: 09/758,175

(22) Filed: Jan. 12, 2001

(51) Int. Cl.[7] .............................. H02M 1/00; F23Q 7/00
(52) U.S. Cl. ........................................... 363/146; 219/264
(58) Field of Search ..................................... 363/142, 144, 363/146; 219/262–266; 439/161, 668, 669

(56) References Cited

U.S. PATENT DOCUMENTS

| | | | |
|---|---|---|---|
| 3,641,469 | * | 2/1972 | Pramaggiore ........................ 337/404 |
| 4,527,048 | * | 7/1985 | Comerford et al. ................. 219/269 |
| 5,116,233 | * | 5/1992 | Croce .................................... 439/161 |

* cited by examiner

Primary Examiner—Matthew Nguyen
(74) Attorney, Agent, or Firm—Dougherty & Troxell

(57) ABSTRACT

A power source supplier usable in an automobile includes a body, a power supply terminal connected to a rear end of the body and able to insert in a cigarette lighter socket in an automobile. A tail base is fixed on a front side of the body, and a coupling member fixed on an end surface of t he tail base and having an intermediate hollow space for another components to couple with therein. Any other components having the size and specifications as the coupling member can be applied to couple with the couple member so that a user can choose one of them.

9 Claims, 5 Drawing Sheets

POWER SOURCE SUPPLIER USABLE IN AN AUTOMOBILE

BACKGROUND OF THE INVENTION

This invention relates to a power source supplier useable in an automobile, particularly to one having a simple structure, high compatibility and excellent practicality.

Many people who drive an automobile may often feel that there is not proper space in the automobile for putting a mobile phone, a speed sensor, a cup, a canned refreshment, etc. Although there are not a little variety of mobile phone bases, cup cases, canned refreshment supporters available on market, they are generally to be adhered or fixed on somewhere on a car body, but often inconvenient to be changed in their locations. In addition, the locations are limited by the length of a power wire for mobile phones, speed sensors, etc., impossible to be altered as wanted. Then the space in an automobile may become smaller, as one of disadvantages. In spite of many power source suppliers usable in an automobile available on markets, they are always restricted to be used with a cigarette lighter socket, as shown in FIG. 1, unable to be utilized for other uses, such as putting a cup or a canned refreshment on them.

SUMMARY OF THE INVENTION

The objective of the invention is to offer a power source supplier usable in an automobile having a simple structure, high compatibility and excellent practicality.

One feature of the invention is a coupling member provided on a tail base of a body to couple with any components for putting a mobile phone or a cup, a canned refreshment, etc.

Another feature of the invention is a power supply terminal provided on one end of the body to insert in a cigarette lighter socket, and the tail base provided on the other end and then the couple member fixed on an end surface of the tail base.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
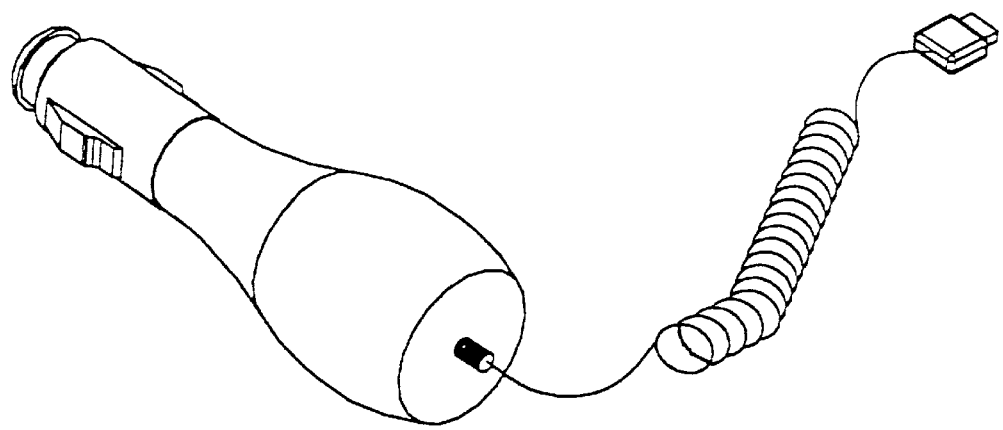
FIG. 1 is a perspective view of a known conventional power source supplier usable in an automobile.
Figure 2:
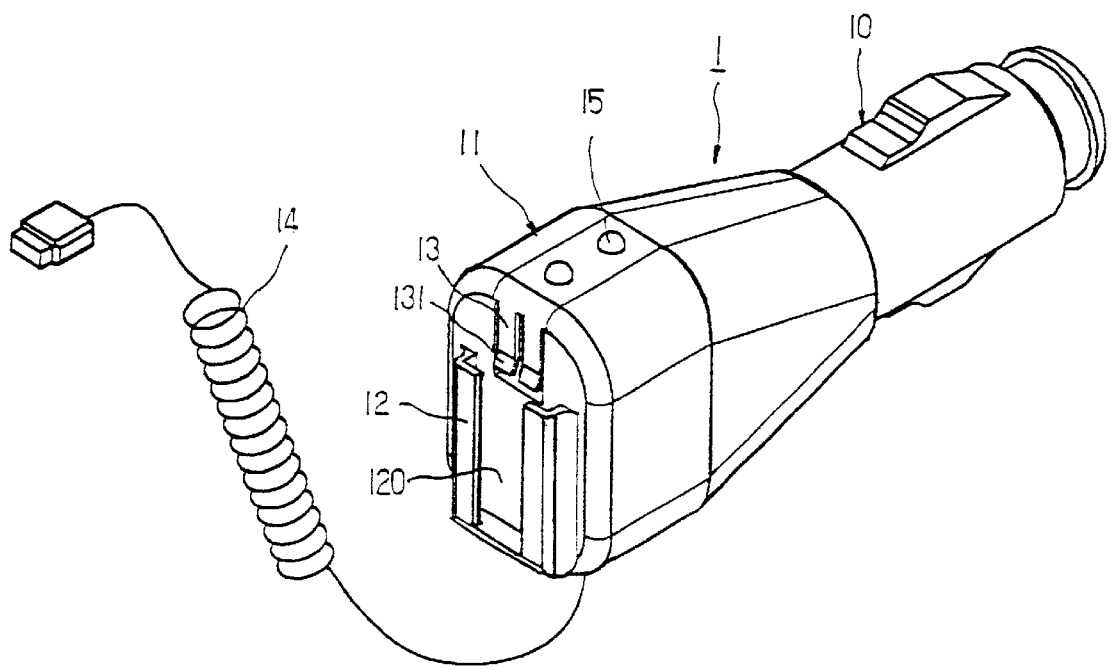
FIG. 2 is a perspective view of a power source supplier usable in an automobile in the present invention.

A first preferred embodiment of a power source supplier in the present invention, as shown in FIG. 2, includes a body 1, a power supply terminal 10 connected to a rear end of the body 1 and to insert in a cigarette lighter socket fixed in an automobile, and a coupling member 12 formed on a front end surface of a tail base 11 of the body 1. The coupling member 12 has a hollow space 120 extending in its intermediate portion for some component to couple with. Further, plural elastic members 13 are fixed on the front end surface of the tail base 11, located just on the intermediate portion of the coupling member 12, having their lower ends 131 bending outward a little for securing some component coupled with the coupling member 12. Any other components having the size able to couple with the coupling member 12 can be used.

Figure 3:
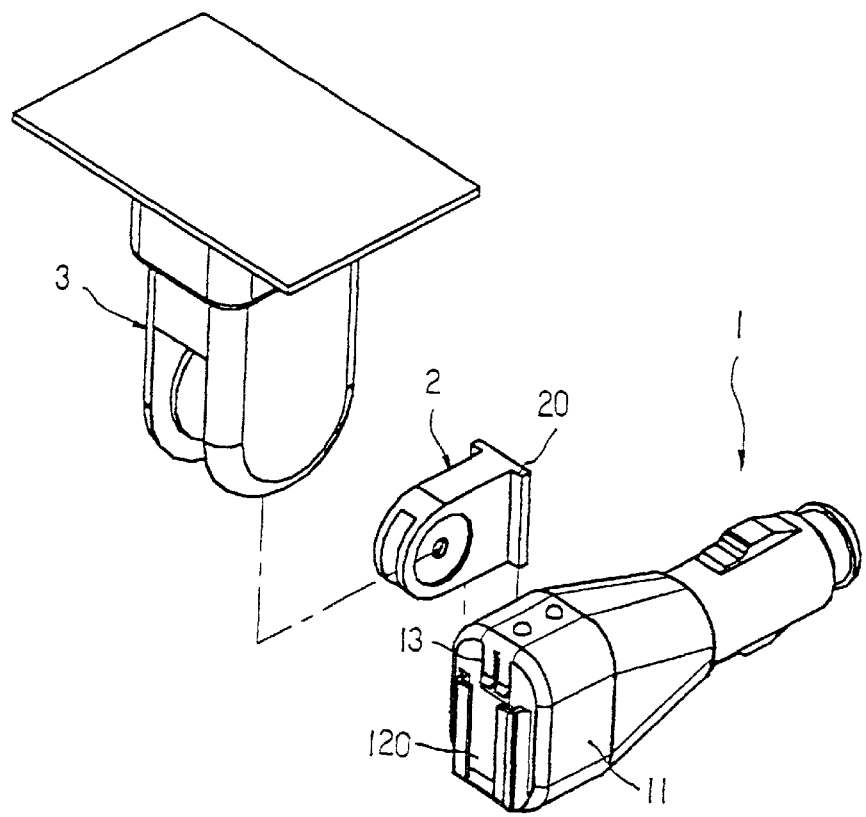
FIG. 3 is an exploded perspective view of a first embodiment of a power source supplier usable in an automobile in the present invention.
Figure 4:
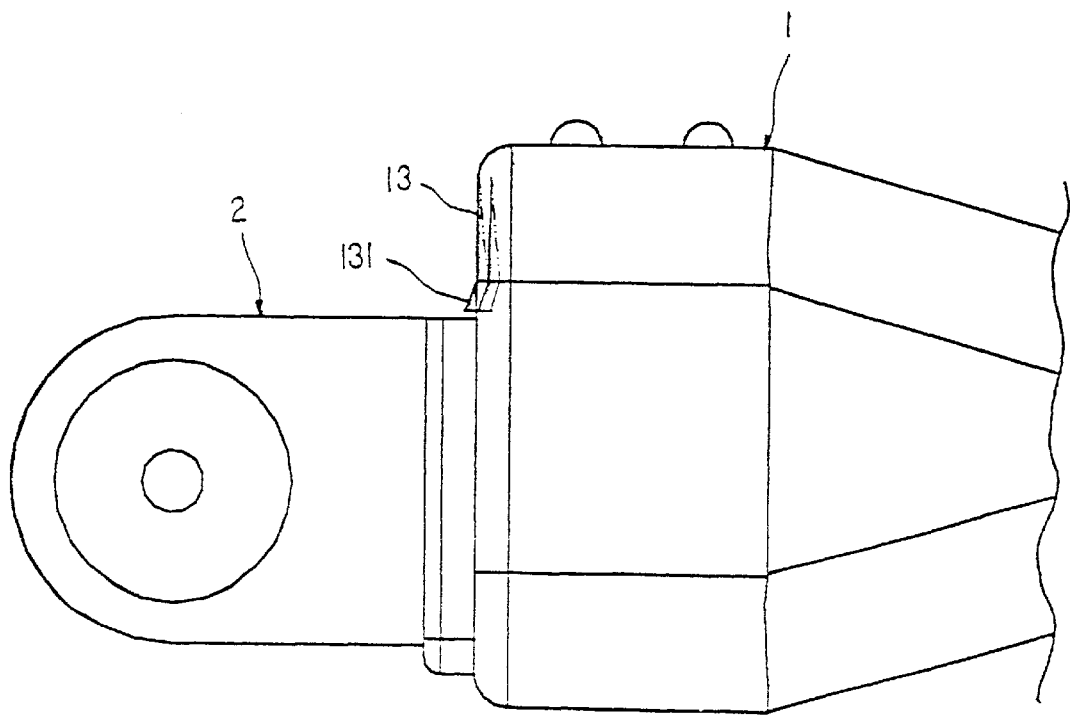
FIG. 4 is a side view of the first embodiment of a power source supplier usable in an automobile in the present invention.
Figure 5:
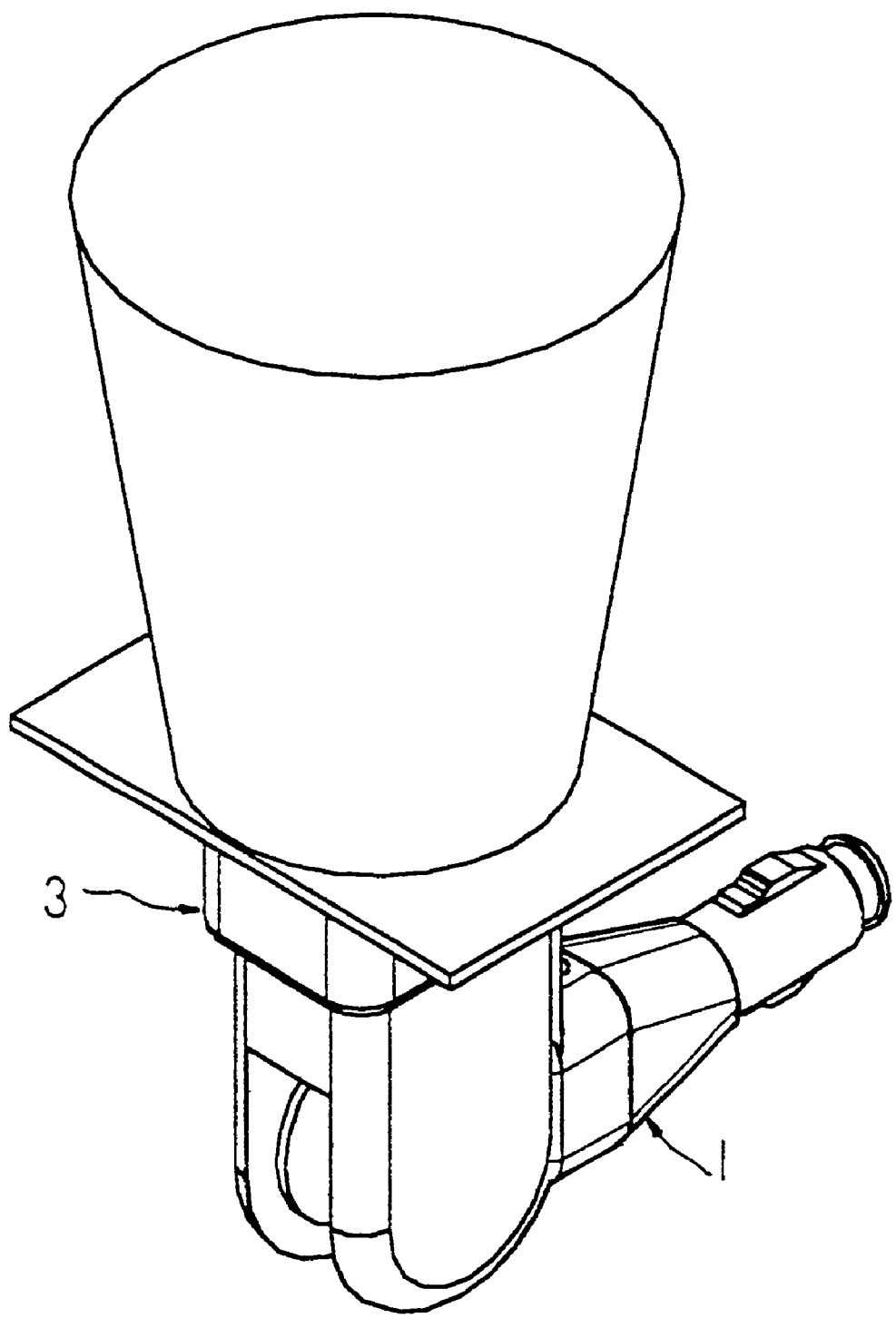
FIG. 5 is a perspective view of the first embodiment of a power source supplier in the present invention.

Next, FIGS. 3, 4 and 5 show respectively the exploded perspective view, the side view, and a perspective view of combined with another component for using the first preferred embodiment of the power source supplier. It can be seen from the Figures that the tail base 11 of the body can be combined with a movable arm-style connector 2, which has a coupling member 20 formed in an inner end. The coupling member 20 can couple with the coupling member 12 by first pressing down the lower ends 131 of the elastic members 13 and then moving in the hollow space 120 of the coupling member 12. After the coupling member 20 completely moved in the hollow space 120, then the lower ends 131 of the elastic members no longer pressed by the coupling member 20 to recover its resilience to its bending outward condition to secure the coupling member 20 stably, preventing the movable connector 2 from falling off the tail base 11 of the body 1.

On the contrary, if the movable arm-style connector 2 is needed to be removed from the tail base 11 of the body 1, only press down the lower ends 131 bending outward of the elastic members 13 and then pull up the movable arm-style connector 2 out of the hollow space 120 of the coupling member 12. Further, a putting base 3 with a flat upper surface can be connected to a front end of the movable arm-style connector 2 so something such as a mobile phone, a speed sensor, a cup, an canned refreshment may be put thereon for use in case of necessity, utilizing limited space in the automobile.

Figure 6:
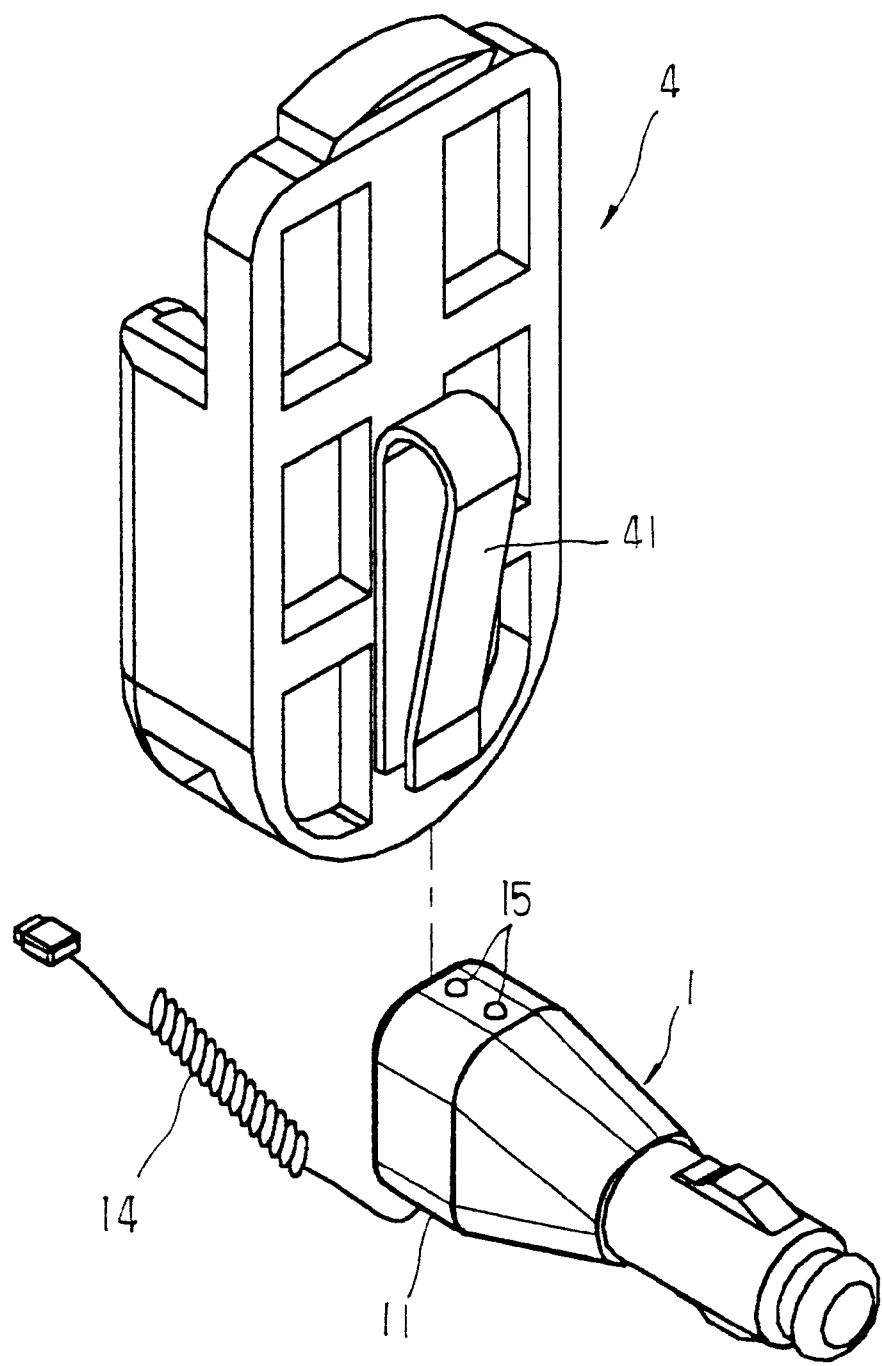
FIG. 6 is an exploded perspective view of a second embodiment of a power source supplier in the present invention.
Figure 7:
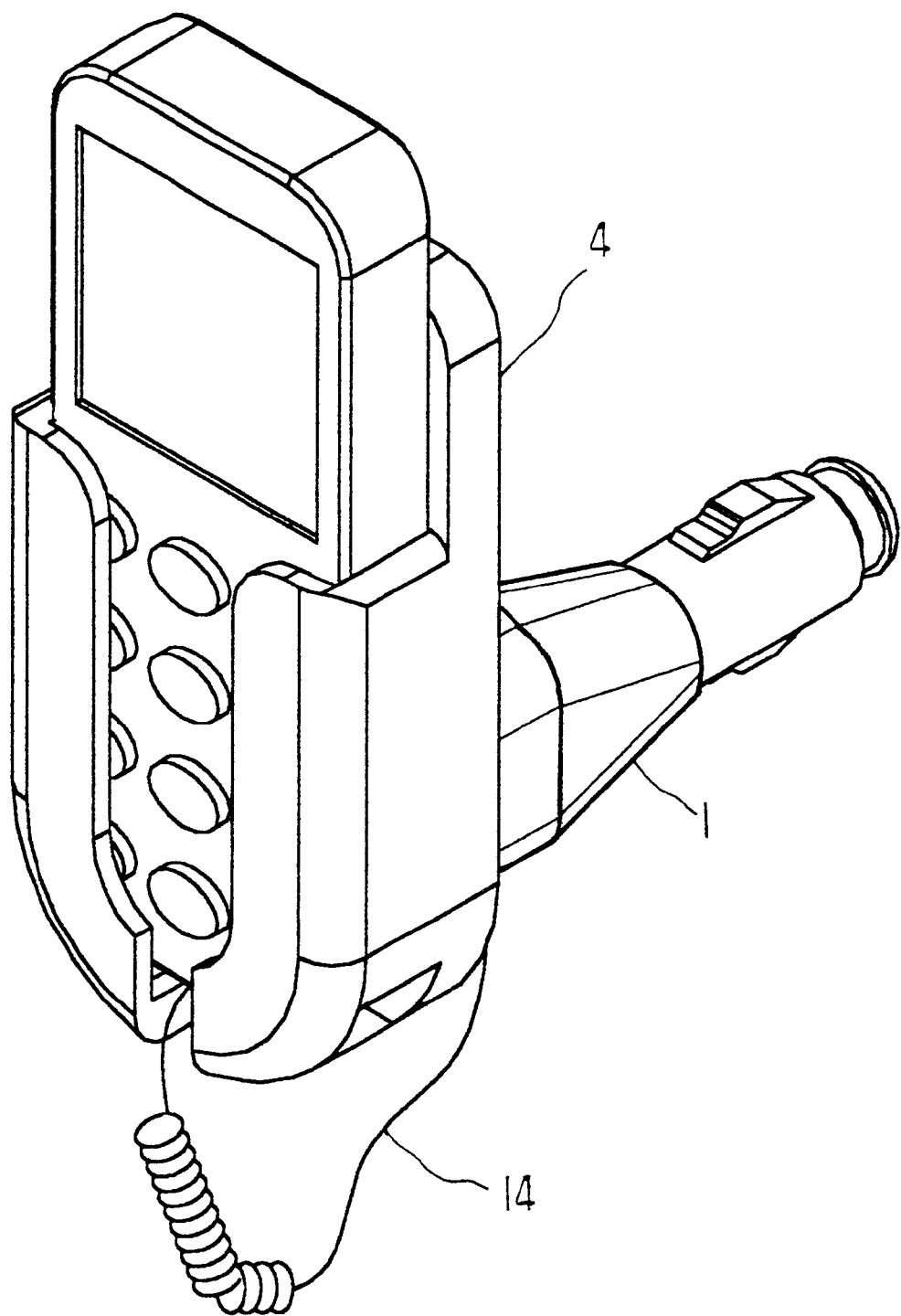
FIG. 7 is a perspective view of the second embodiment of a power source supplier in the present invention, showing a mobile phone inserted therein for charging.

Further, FIGS. 6 and 7 show a second preferred embodiment of a power source supplier in the invention, having a difference from the first preferred embodiment that the tail base 11 of the body 1 has a removable base 14 for keeping normally a mobile phone therein and for charging electricity of the mobile phone at the same time. The removable base 14 has a narrow U-shaped elastic clamp 41 fixed on a rear end surface and suited to couple in the hollow space 120 of the coupling member 12 of the body 1 to support the removable base 4 with the tail base 11, and a wire 14 can be connected between the body 1 and the mobile phone for charging. In addition, an LED lamp 15 can be provided on the body 1 to indicate whether the mobile phone is charged or not.

The invention has the following advantages, as can be understood from the aforesaid description.

1. It has a simple structure, easy to assemble and disassemble, increasing convenience for a user.

2. Many products on market can be applied and used together with it so long as its size and specifications conforming to the invention, anything like a removable clamp, a cup support base, a mini fan, a small electric appliance, etc. So the invention has high compatibility to alter things to be used together.

3. It can offer a space for putting things to be take or put easily, so a user can not be at loss in putting things such as a mobile phone, a cup, etc, without need of adhering or locking it, effectively making use of limited space in an automobile.

While the preferred embodiments of the invention have been described above, it will be recognized and understood that various modifications may be made therein and the appended claims are intended to cover all the modifications that may fall within the spirit and scope of the invention.

I claim:

1. A power source supplier usable in an automobile comprising a body, a power supply terminal fixed at a rear end o f said body and able to be inserted in a cigarette lighter socket in an automobile, characterized by said body having a front end surface fixed with a tail base, a coupling member fixed on said tail base and having an intermediate hollow space for coupling with another component.

2. The power source supplier usable in an automobile as claimed in claim 1, wherein plural elastic members are fixed on said end surface of said tail base just on said intermediate hollow space of said coupling member.

3. The power source supplier usable in an automobile as claimed in claim 1, wherein said plural elastic members have their lower ends bending outward a little.

4. The power source supplier usable in an automobile as claimed in claim 1, wherein a movable arm-style connector is connected to said tail base of said body.

5. The power source supplier usable in an automobile as claimed in claim 1, wherein said movable arm-style connector has a coupling member formed in a rear end.

6. The power source supplier usable in an automobile as claimed in claim 1, wherein said movable arm-style connector has a front end connected to a putting base.

7. The power source supplier usable in an automobile as claimed in claim 1, wherein said tail base of said body is connected to a removable base.

8. The power source supplier usable in an automobile as claimed in claim 1, wherein a power wire is connected to a side of said body.

9. The power source supplier usable in an automobile as claimed in claim 1, wherein an LED lamp is provided on said body.

\* \* \* \* \*